(12) United States Patent
Mao et al.

(10) Patent No.: US 11,641,414 B2
(45) Date of Patent: May 2, 2023

(54) TERMINAL WITH A COMPACT COMPONENT LAYOUT

(71) Applicant: HUAWEI TECHNOLOGIES CO., LTD., Guangdong (CN)

(72) Inventors: Weihua Mao, Shanghai (CN); Ren Lv, Shanghai (CN); Peng Zha, Shanghai (CN); Bo Wu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 82 days.

(21) Appl. No.: 16/981,591

(22) PCT Filed: Mar. 20, 2018

(86) PCT No.: PCT/CN2018/079614
§ 371 (c)(1),
(2) Date: Sep. 16, 2020

(87) PCT Pub. No.: WO2019/178743
PCT Pub. Date: Sep. 26, 2019

(65) Prior Publication Data
US 2021/0075896 A1    Mar. 11, 2021

(51) Int. Cl.
*H04N 5/225* (2006.01)
*H04N 5/262* (2006.01)
*H04N 5/232* (2006.01)
*H04M 1/02* (2006.01)
*G03B 15/03* (2021.01)
(Continued)

(52) U.S. Cl.
CPC .......... *H04M 1/0264* (2013.01); *G03B 15/03* (2013.01); *H04M 1/18* (2013.01); *H04N 5/2226* (2013.01); *H04N 5/2253* (2013.01); *H04N 5/2257* (2013.01)

(58) Field of Classification Search
None
See application file for complete search history.

(56) References Cited

U.S. PATENT DOCUMENTS 7,561,191 B2 * 7/2009 May .................. H04N 5/23238
                                                           348/262
9,064,295 B2 * 6/2015 Sassi ................... H04N 19/115
(Continued)

FOREIGN PATENT DOCUMENTS

CN    204598501 U    8/2015
CN    105611007 A    5/2016
(Continued)

OTHER PUBLICATIONS

User Guide LG G5 LG-H850, 2016, total 144 pages.
(Continued)

*Primary Examiner* — Tuan A Tran
(74) *Attorney, Agent, or Firm* — Womble Bond Dickinson (US) LLP

(57) ABSTRACT

A terminal includes a first opening and a second opening. At least two cameras and a distance detection sensor are disposed in the first opening, and the distance detection sensor is located in a gap between two of cameras, while a flash is disposed in the second opening. In this way, there are few openings on the terminal body, and the openings are small, layouts of components are compact, and appearance is more beautiful.

20 Claims, 12 Drawing Sheets

(51) Int. Cl.
*H04M 1/18* (2006.01)
*H04N 5/222* (2006.01)

(56) References Cited

U.S. PATENT DOCUMENTS

| | | | | |
|---|---|---|---|---|
| 9,674,417 | B2* | 6/2017 | Kim | G02B 7/09 |
| 9,768,821 | B2* | 9/2017 | Kim | H04M 1/0283 |
| 9,922,238 | B2* | 3/2018 | Bourlai | G06V 40/172 |
| 9,973,669 | B2* | 5/2018 | Vittu | H04N 5/2253 |
| 9,986,148 | B2* | 5/2018 | Xiao | H04N 5/232123 |
| 10,012,888 | B1* | 7/2018 | Penaflor | H04M 1/026 |
| 10,057,484 | B1* | 8/2018 | Lombardi | H04N 5/23218 |
| 10,182,365 | B2* | 1/2019 | Gerlach | G09B 29/006 |
| 10,203,587 | B2* | 2/2019 | Kim | G03B 17/12 |
| 10,291,833 | B2* | 5/2019 | Kim | H04N 5/2259 |
| 10,295,898 | B2* | 5/2019 | Rebot | G03B 21/64 |
| 10,389,858 | B2* | 8/2019 | Yu | G02B 7/08 |
| 10,567,630 | B2* | 2/2020 | Hawthorne | G06F 1/1647 |
| 10,652,450 | B2* | 5/2020 | Li | G02B 7/38 |
| 10,708,517 | B2* | 7/2020 | Lee | H04N 5/2258 |
| 11,036,782 | B2* | 6/2021 | Padmanabhan | H04N 21/47 |
| 2014/0075355 | A1 | 3/2014 | Kim | |
| 2016/0057188 | A1* | 2/2016 | Padmanabhan | H04N 21/4126 709/204 |
| 2017/0085764 | A1 | 3/2017 | Kim et al. | |

FOREIGN PATENT DOCUMENTS

| | | |
|---|---|---|
| CN | 205646152 U | 10/2016 |
| CN | 205901870 U | 1/2017 |
| CN | 106375503 A | 2/2017 |
| CN | 205945922 U | 2/2017 |
| CN | 206042074 U | 3/2017 |
| CN | 107037665 A | 8/2017 |
| CN | 107181842 A | 9/2017 |
| CN | 107231459 A | 10/2017 |
| CN | 206922894 U | 1/2018 |
| JP | 2016114659 A | 6/2016 |
| KR | 20150069964 A | 6/2015 |

OTHER PUBLICATIONS

NTT docomo L-01J V20 PRO Instruction Manual, Edition 1.1, NTT Docomo, Inc., LG Electronics Inc., NTT Docomo, Inc., LG Electronics Inc., Internet URL:https://www.nttdocomo.co.jp/binary/pdf/support/trouble/manual/download/L-01J_J_syousai.pdf >, Feb. 28, 2017, 5 pages (with an English translation).

Samsung: "User Guide LG G5 LG-H850", Jan. 1, 2016, pp. 1-729, XP055772687, Retrieved from the Internet: URL:https://gscsb2c.lge.com/downloadFile? fileld=8i9WqsCftUMZMuhJql21 A, retrieved on Feb. 5, 2021, total 149 pages.

Lgh850: "LG ManualsandDocuments",Apr. 7, 2016 (Apr. 7, 2016),XP055914168,total:4pages.

* cited by examiner

TERMINAL WITH A COMPACT COMPONENT LAYOUT

CROSS-REFERENCE TO RELATED APPLICATIONS

This application is a National Stage of International Application No. PCT/CN2018/079614, filed on Mar. 20, 2018, which is hereby incorporated by reference in its entirety.

TECHNICAL FIELD

This application relates to the field of electronic devices, and in particular, to a terminal.

BACKGROUND

As information technologies develop rapidly, terminal products (such as a mobile phone, a tablet, and a notebook computer) are used more frequently, and more applications are integrated into a terminal. Photographing has become one of mandatory applications of the terminal products.

Currently, a camera is installed on a terminal product to perform photographing, and on an increasing quantity of terminal products, an original single camera is transformed into dual cameras. When the dual cameras are installed on the terminal, an opening may be opened on a housing of the terminal for installation, or two openings may be opened to install the two cameras respectively.

In addition, to improve photographing performance, a flash and a distance detection sensor are disposed on a same side of a camera disposed in the terminal. There are two existing setting solutions. In the first manner, separate openings are added outside the cameras to separately install the flash and the distance detection sensor. However, in this manner, two separate openings need to be added on the terminal, and this affects an appearance of the back of the terminal to some extent. In the second manner, the flash and the distance detection sensor are installed together in one opening in which two cameras are located. However, in this manner, the flash and the distance detection sensor easily interfere with each other, and a distance is between the flash and the distance detection sensor. In this way, when the flash and the distance detection sensor are disposed in the opening, an opening area is increased, and an appearance is also affected.

SUMMARY

This application provides a terminal, to resolve a problem in an existing terminal that when installing a camera, a flash, and a sensor, an appearance of a terminal body is affected.

The application provides a terminal, including a terminal body, and at least two cameras, a flash, and a distance detection sensor that are disposed in the terminal body, where the terminal body includes a first opening and a second opening, where the at least two cameras and the distance detection sensor are disposed in the first opening, and the distance detection sensor is located in a gap between two of cameras; and the flash is disposed in the second opening.

In an embodiment, an environment detection sensor is further disposed in the terminal body, and the environment detection sensor is disposed in the second opening.

In an embodiment, an environment detection sensor is disposed in the terminal body, the environment detection sensor is disposed in the first opening, and the environment detection sensor is disposed in the gap between the two of the cameras. In this way, when the environment detection sensor is added, no opening needs to be added to install the environment detection sensor, so that a quantity of openings in the terminal body is reduced. In addition, when the environment detection sensor is disposed in the first opening, there is no limitation on a gap between the environment detection sensor and the distance detection sensor. Therefore, when the environment detection sensor and the distance detection sensor are disposed in a gap between two adjacent cameras, occupied space is relatively small, and no extra space needs to be reserved in the first opening for disposing the environment detection sensor, so that an opening area of the first opening does not increase due to disposing of the environment detection sensor.

In an embodiment, the environment detection sensor is located in the second opening, and a light cone of the flash is partially overlapped with a light cone of the environment detection sensor. In this way, when the flash and the environment detection sensor are disposed in the second opening, a spacing between the flash and the environment detection sensor may be reduced. Therefore, space occupied by the flash and the environment detection sensor is reduced, and an opening area of the first opening is reduced.

In an embodiment, there are two cameras, and the two cameras are disposed at an interval along a direction in which a maximum size of the first opening is located. In this way, the two cameras are arranged compactly in the first opening, and have a more beautiful appearance.

In an embodiment, the distance detection sensor is located on one side of a line connecting centers of the two cameras, or the distance detection sensor is located on a line connecting centers of the two cameras.

In an embodiment, the first opening extends and is opened along a direction in which a top edge or a side edge of the terminal body is located. In this way, an extension direction of the first opening in the terminal body is consistent with an edge of the terminal body, thereby ensuring aesthetics of the first opening in the terminal body.

In an embodiment, the second opening is disposed close to the first opening. In this way, the camera, the flash, and the distance detection sensor are arranged compactly in the terminal body, and have a more beautiful appearance.

In an embodiment, the distance detection sensor has a long side edge and a short side edge, and the short side edge of the distance detection sensor is in parallel to a direction in which a maximum size of the first opening is located. In this way, when the distance detection sensor is disposed between the two cameras, a spacing between the two cameras does not increase. This ensures that the cameras and the distance detection sensor occupy relatively small space in the first opening, so that a length of the first opening is not easy to be excessively large.

In an embodiment, a dust-proof component is sleeved on a periphery of the cameras along an axial direction of the cameras. In this way, the dust-proof component prevents impurities, such as dust, from entering the cameras and causing interference to the camera.

In an embodiment, the dust-proof component includes at least two layers of dust-proof foam, where the at least two layers of dust-proof foam are stacked sequentially along an axial direction of the cameras, an outermost layer of dust-proof foam of the at least two layers of dust-proof foam surrounds an outer side of the camera, and a plurality of through openings that the at least two cameras can pass through are disposed on remaining of the dust-proof foam.

In this way, the at least two layers of dust-proof foam increase a dust-proof effect on the camera.

In an embodiment a first circuit board is located on the dust-proof foam adjacent to the outermost layer of dust-proof foam, the distance detection sensor is disposed on the first circuit board, and one end of the first circuit board is connected to a second circuit board in the terminal body by a connection line that passes between two of layers of the dust-proof foam. In this way, dust is prevented from entering the cameras from the connection line, so that the cameras are not interfered by the dust.

In an embodiment, a thickness of the connection line located between the two layers of dust-proof foam decreases sequentially from the first circuit board to the second circuit board. In this way, even if the dust enters from one end of the connection line, the connection lines that are successively reduced block the dust, so that the dust is not easily penetrated between the two of layers of dust-proof foam and then is not easy to enter the camera.

In an embodiment, the first circuit board is a flexible printed circuit. In this way, the first circuit board is flexible to some extent, and is more easily fastened when being installed on dust-proof foam.

In an embodiment, the second circuit board is a main control circuit board.

In an embodiment, the second opening is a circular opening enclosed by two semi-circular openings.

In an embodiment, the environment detection sensor is disposed in one of the two semi-circular openings, and the flash is disposed in the other semi-circular opening of the two semi-circular openings.

In an embodiment, the terminal body includes a housing, where the first opening and the second opening are opened on a surface of the housing that faces away from a screen, and/or the first opening and the second opening are opened on a surface of the housing that faces the screen. In this way, the camera, the flash, and the distance detection sensor may be located on a front side of the terminal, or may be located on a rear side of the terminal, or the camera, the flash, and the distance detection sensor may be located on both the front side and the rear side of the terminal, to achieve a multi-direction photographing objective.

In the terminal provided in the application, the first opening and the second opening are opened in the terminal body. The at least two cameras and the distance detection sensor are disposed in the first opening, the distance detection sensor is located in the gap between the two of the cameras, and the flash is disposed in the second opening. In this way, by using a gap that exists between two adjacent cameras when the two adjacent cameras are disposed in the first opening, when the distance detection sensor is disposed in the first opening, no extra space needs to be reserved in the first opening to dispose the distance detection sensor, thereby ensuring that an opening area of the first opening does not increase due to the disposing of the distance detection sensor. Compared with the prior art in which the cameras, the distance detection sensor, and the flash are disposed in a same opening, in an embodiment, an objective of downsizing the first opening is achieved. In addition, in an embodiment, because the at least two cameras and the distance detection sensor are disposed in the first opening, and the flash is disposed in the second opening, compared with an existing terminal in which the camera, the distance detection sensor, and the flash are disposed in separate openings, and a quantity of openings is reduced. Therefore, the terminal provided in an embodiment has few openings, and the openings are small, thereby achieving an objective of a compact layout of the camera, the flash, and the distance detection sensor, so that an appearance of the terminal is more beautiful.

DESCRIPTION OF EMBODIMENTS

To make the technical solutions in the embodiments of the application clearer, the applicant first defines a few components or terms for the following description. A "distance detection sensor" is configured to detect a distance between a terminal and a target object, thereby adjusting a photographing parameter of a camera based on the distance. A "terminal" may include a mobile phone, a tablet, a personal digital assistant (PDA), a point of sales (Point of Sales, POS), an in-vehicle computer, and the like.

Embodiment 1

Figure 1A:
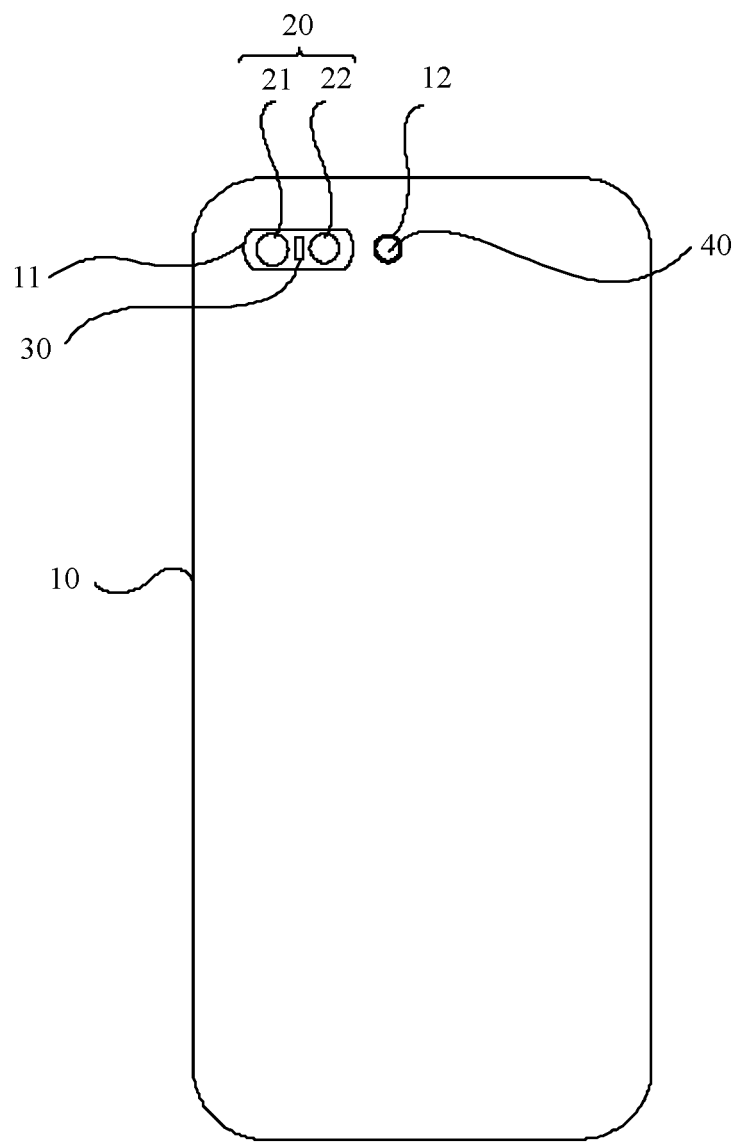
FIG. 1A is a schematic structural diagram of a rear side of a terminal according to Embodiment 1 of the application.
Figure 2A:
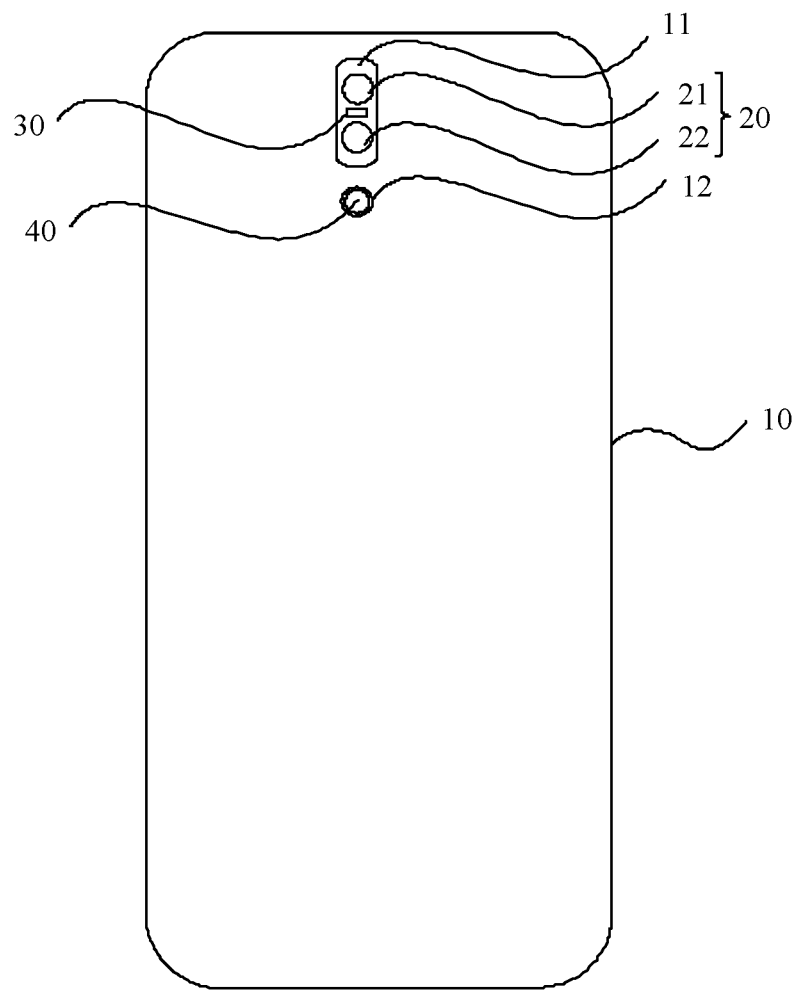
FIG. 2A and FIG. 2B are other schematic structural diagrams of a rear side of a terminal according to Embodiment 1 of the application.
Figure 2B:
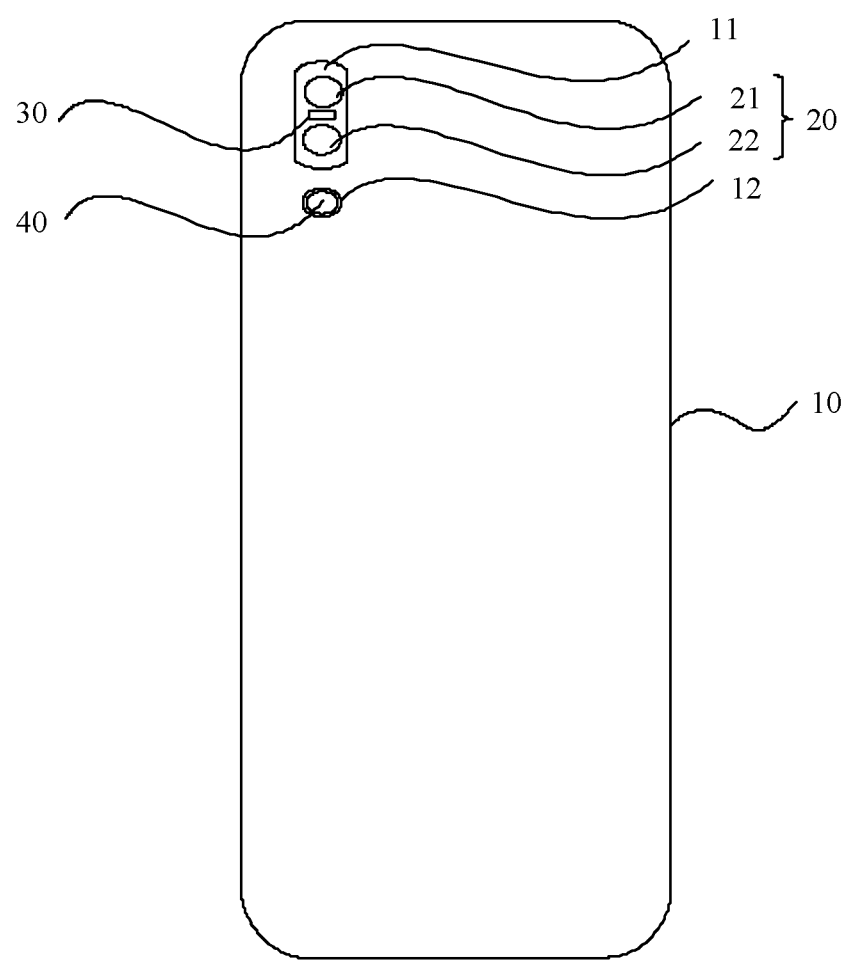

In an embodiment, an example in which the terminal is a mobile phone is used. As shown in FIG. 1A and FIG. 2B, the terminal includes a terminal body 10, and at least two cameras 20, a flash 40, and a distance detection sensor 30 that are disposed in the terminal body 10. The distance detection sensor 30 is configured to detect a distance between the terminal and a target object. In this way, during photographing, a main control circuit board in the terminal body 10 adjusts a related parameter (for example, light intensity and a focus position) of the cameras 20 or the flash 40 based on the distance detected by the distance detection sensor 30, so that a photographing effect is better.

In an existing mobile phone, when the dual cameras 20, the flash 40, and the distance detection sensor 30 are disposed in the terminal body 10, separate openings are usually disposed, or the dual cameras 20, the flash 40, and the distance detection sensor 30 are disposed in a opening disposed in the terminal body 10. When the dual cameras 20, the flash 40, and the distance detection sensor 30 are disposed separately, a quantity of openings in the terminal body 10 is relatively large, and consequently, an appearance of the terminal is affected to some extent. However, when the dual cameras 20, the flash 40, and the distance detection sensor 30 are disposed in one opening, a lens of the flash 40 is designed as a Fresnel texture structure by using secondary optics, to change a light emitting angle of an LED. The flash 40 of the mobile phone converges light to 70° to 80° by using a focusing feature of a flash lens, the distance detection sensor 30 emits infrared light, and a wavelength is different from that of visible light. Therefore, the distance detection sensor 30 cannot use a Fresnel lens that concentrates visible light, that is, cannot share a cover of the flash 40. If the distance detection sensor 30 and the flash 40 need to share the cover, lenses need to be designed separately, and light cones cannot overlap. In this way, the distance detection sensor 30 and the flash 40 are disposed in one opening, and an interval needs to be reserved between the distance detection sensor 30 and the flash 40, to ensure that the light cones of the distance detection sensor 30 and the flash 40 do not easily overlap. In this way, relatively large space is occupied when the distance detection sensor 30 and the flash 40 are disposed in one opening, and therefore, an opening area of the opening is relatively large. For example, a length of the opening is increased, or a width of the opening is increased, or both a length and a width of the opening are relatively large, and consequently appearance aesthetics of the terminal is affected to some extent.

Figure 1B:
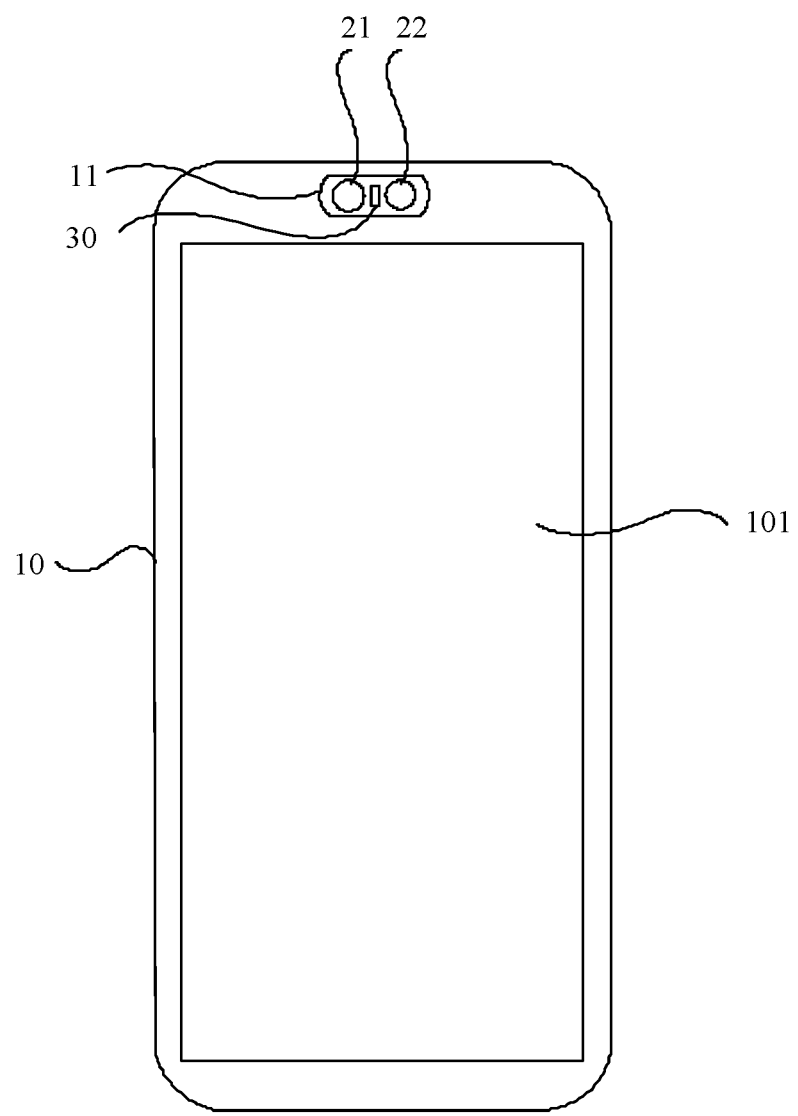
FIG. 1B is a schematic structural diagram of a front side of a terminal according to Embodiment 1 of the application.
Figure 1C:
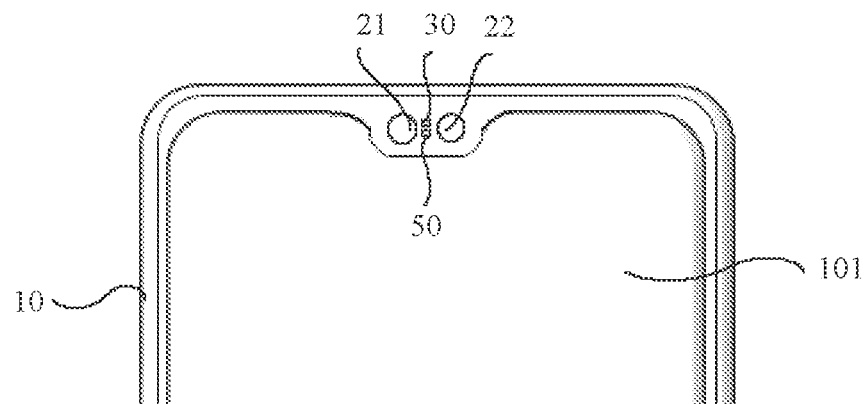
FIG. 1C is another schematic structural diagram of a front side of a terminal according to Embodiment 1 of the application.

Therefore, to resolve the foregoing problem, in an embodiment, the terminal body 10 includes a first opening 11 and a second opening 12. The first opening 11 and the second opening 12 may be located on a same side of the terminal body 10. For example, both the first opening 11 and the second opening 12 may be located on a rear side of the terminal body 10 (as shown in FIG. 1A), or the first opening 11 and the second opening 12 may be located on a front side of the terminal body 10. As shown in FIG. 1B and FIG. 1C, the first opening 11 is located at an upper part of the front side of the terminal body 10. In an embodiment, FIG. 1A is used as an example. The first opening 11 and the second opening 12 are located on a rear side of the terminal body 10. The at least two cameras 20 and the distance detection sensor 30 are disposed in the first opening 11. The flash 40 is not disposed in the first opening 11, the distance detection sensor 30 is located in a gap between two of the cameras 20, and the flash 40 is disposed in the second opening 12.

In an embodiment, when the at least two cameras 20 are disposed in the first opening 11, because a gap usually exists between two adjacent cameras 20, the distance detection sensor 30 may be disposed in the gap, even if there is no interval between the two adjacent cameras 20. For example, the two adjacent cameras 20 are disposed side by side. However, because the cameras 20 are usually in a circular shape, even if the two adjacent cameras 20 are disposed side by side, a blank gap usually exists between the two adjacent cameras 20 on an upper side and a lower side or a left side and a right side of an intersection point. In this case, the distance detection sensor 30 may be disposed in the gap. In this way, no extra space needs to be reserved in the first opening 11 to dispose the distance detection sensor 30.

However, in an existing terminal, when the dual cameras 20, the flash 40, and the distance detection sensor 30 are disposed in one opening, because both the flash 40 and the distance detection sensor 30 need to be disposed, occupied space is relatively large. Therefore, when the flash 40 and the distance detection sensor 30 are disposed in the opening in which the cameras 20 are disposed, extra space needs to be reserved in the opening for disposing the flash 40 and the distance detection sensor 30. Therefore, a length or a width of the opening for disposing the cameras 20, the flash 40, and the distance detection sensor 30 in the existing terminal is increased. However, in an embodiment, by using a gap that exists between the two adjacent cameras 20 when the two adjacent cameras 20 are disposed in the first opening 11, when the distance detection sensor 30 is disposed in the first opening 11, no extra space needs to be reserved in the first opening 11 to dispose the distance detection sensor 30, so that it is ensured that an opening area of the first opening 11 does not increase due to disposing of the distance detection sensor 30.

Therefore, compared with the opening in which the cameras, the flash, and the distance detection sensor are disposed in the prior art, the opening area of the first opening 11 is reduced in an embodiment. In addition, in an embodiment, because the at least two cameras 20 and the distance detection sensor 30 are disposed in the first opening 11, and the flash 40 is disposed in the second opening 12, compared with an existing terminal in which the cameras 20, the distance detection sensor 30, and the flash 40 are disposed in separate openings, a quantity of openings is reduced. Therefore, the terminal provided in an embodiment has few openings, and the openings are small, thereby achieving an objective of a compact layout of the cameras 20, the flash 40, and the distance detection sensor 30, so that an appearance of the terminal is more beautiful.

In addition, in an embodiment, the distance detection sensor 30 is disposed in the first opening 11, and the flash 40 is disposed in the second opening 12. For example, the distance detection sensor 30 and the flash 40 are respectively located in different openings. Compared with the prior art in which the distance detection sensor 30 and the flash 40 are disposed in a same opening, in an embodiment, because the distance detection sensor 30 and the flash 40 are disposed in two openings at intervals, when the visible light emitted by the flash 40 and the infrared light emitted by the distance detection sensor 30 are not easily interfered, an interference of the flash 40 on the distance detection sensor 30 is avoided.

In an embodiment, a quantity of cameras 20 may be set to two or three, and a specific quantity is set based on an actual requirement. In an embodiment, as shown in FIG. 1A, there are two cameras 20, which are respectively a first camera 21 and a second camera 22. The distance detection sensor 30 is disposed in a gap between the first camera 21 and the second camera 22. It should be noted that the gap between the first camera 21 and the second camera 22 is usually set based on a shooting effect of the two cameras 20, and the distance detection sensor 30 usually occupies relatively small space. Therefore, when the distance detection sensor 30 is disposed in the gap between the first camera 20 and the second camera 22, the distance detection sensor 30 does not occupy space of the first opening 11 exactly. Therefore, when the distance detection sensor 30 is disposed in the first opening 11, an opening size of the first opening 11 is not affected. Therefore, an objective that the opening area of the first opening 11 is not easy to be excessively large is ensured.

In an embodiment, when the terminal body 10 includes the first opening 11 and the second opening 12, the second opening 12 may be disposed around the first opening 11, to ensure a compact layout of the cameras 20, the flash 40, and the distance detection sensor 30, the second opening 12 may be disposed close to the first opening 11. A specific disposing manner may be set based on an actual requirement, and is not limited in an embodiment.

In addition, in an embodiment, as shown in FIG. 1A, the first opening 11 and the second opening 12 may be disposed along a horizontal direction of the terminal body 10. For example, the first opening 11 and the second opening 12 are sequentially arranged from left to right. Alternatively, as shown in FIG. 2A, the first opening 11 and the second opening 12 are disposed along a vertical direction of the terminal body 10. For example, the first opening 11 and the second opening 12 are sequentially disposed from top to bottom. A specific disposing manner is set based on an actual requirement, and is not limited in an embodiment. When the first opening 11 and the second opening 12 are disposed from top to bottom on a rear side of the terminal body 10, as shown in FIG. 2A, the first opening 11 and the second opening 12 may be located in the middle of the rear side of the terminal body 10, or as shown in FIG. 2B, the first opening 11 and the second opening 12 may be located on the rear side of the terminal body 10 and close to a side portion of the terminal body 10.

In an embodiment, shapes of the first opening 11 and the second opening 12 may be square openings, circular openings, or elliptical openings. The shapes of the first opening 11 and the second opening 12 may be set based on an actual requirement. The shapes of the first opening 11 and the second opening 12 are not limited in an embodiment.

It should be noted that the first opening 11 and the second opening 12 in an embodiment are merely used to distinguish between openings, but are not used to limit the openings.

According to the terminal provided in an embodiment, the terminal body 10 includes the first opening 11 and the second opening 12. The at least two cameras 20 and the distance detection sensor 30 are disposed in the first opening 11, and the distance detection sensor 30 is located in the gap between two of the cameras 20. The flash 40 is disposed in the second opening 12. In this way, by using a gap that exists between two adjacent cameras 20 when the two adjacent cameras 20 are disposed in the first opening 11, when the distance detection sensor 30 is disposed in the first opening 11, no extra space needs to be reserved in the first opening 11 to dispose the distance detection sensor 30, so that it is ensured that the opening area of the first opening 11 does not increase due to the disposing of the distance detection sensor 30. Compared with the prior art in which the cameras 20, the distance detection sensor 30, and the flash 40 are disposed in a same opening, in an embodiment, an objective of downsizing the first opening 11 is achieved. In addition, in an embodiment, because the at least two cameras 20 and the distance detection sensor 30 are disposed in the first opening 11, and the flash 40 is disposed in the second opening 12, compared with an existing terminal in which the cameras 20, the distance detection sensor 30, and the flash 40 are disposed in separate openings, a quantity of openings is reduced. Therefore, the terminal provided in an embodiment has few openings, and the openings are small, thereby achieving an objective of a compact layout of the cameras 20, the flash 40, and the distance detection sensor 30, so that an appearance of the terminal is more beautiful.

In an embodiment, there are two cameras 20. As shown in FIG. 1A and FIG. 2B, the two cameras are respectively a first camera 21 and a second camera 22. The first camera 21, the distance detection sensor 30, and the second camera 22 are disposed at intervals along a direction in which a maximum size of the first opening 11 is located. For example, the first opening 11 is a long strip opening, including a long side and a short side, and the direction in which the maximum size of the first opening 11 is located is an extension direction of the long side. Therefore, the first camera 21, the distance detection sensor 30, and the second camera 22 are disposed at intervals along an extension direction of the long side of the first opening 11. For example, as shown in FIG. 1A, when the extension direction of the long side of the first opening 11 is a horizontal direction, that is, the first opening 11 is opened horizontally, the first camera 21, the distance detection sensor 30, and the second camera 22 are horizontally distributed. As shown in FIG. 2A, when the extension direction of the long side of the first opening 11 is a vertical direction, that is, the first opening 11 is vertically opened, the first camera 21, the distance detection sensor 30, and the second camera 22 are vertically distributed.

In an embodiment, the distance detection sensor 30 is located at one side of a line connecting centers of the two cameras 20. In this way, the distance detection sensor 30 is located in a gap that is at an upper or a lower side, or a left or right side between the two cameras 20, or is located on a line connecting centers of the two cameras 20. In this way, the distance detection sensor 30 is located in the gap between the two cameras.

In an embodiment, the first opening 11 may be located on an upper part of the rear side of the terminal body 10. In addition, as shown in FIG. 1A, the direction in which the maximum size of the first opening 11 is located is in parallel to a top edge or a side edge of the terminal body 10. For example, the extension direction of the long side of the first opening 11 is in parallel to the top edge or a side wall of the terminal body 10. When the extension direction of the long side of the first opening 11 is in parallel to the top edge of the terminal body 10, the first opening 11 extends horizontally on the terminal body 10. Alternatively, in an embodiment, as shown in FIG. 2A, the extension direction of the long side of the first opening 11 may further be in parallel to the side edge of the terminal body 10. For example, the first opening 11 extends vertically on the terminal body 10.

In an embodiment, the second opening 12 is disposed close to the first opening 11, that is, the second opening 12 is disposed adjacent to the first opening 11. For example, the second opening 12 may be disposed close to the short side of the first opening 11. As shown in FIG. 1A, when the first opening 11 is opened horizontally, the second opening 12 is located at a left side or a right side of the first opening 11, that is, disposed at a side close to the short side of the first opening 11. As shown in FIG. 2A and FIG. 2B, when the first opening 11 is vertically opened, the second opening 12 is located at an upper or lower side of the first opening 11, that is, the second opening 12 is disposed at a side close to the short side of the first opening 11, or the second opening 12 may be disposed close to the long side of the first opening 11. For example, when the first opening 11 is horizontally drilled, the second opening 12 may also be located at the upper or lower side of the first opening 11. Similarly, when the first opening 11 is vertically drilled, the second opening 12 may also be located at a left side or a right side of the first opening 11.

In an embodiment, the distance detection sensor 30 is a square-shaped sensor and has a long side edge and a short side edge. To prevent the distance detection sensor 30 from occupying relatively large space of the first opening 11, in an embodiment, the short side edge of the distance detection sensor 30 is in parallel to the direction in which the maximum size of the first opening 11 is located. As shown in FIG. 1A, the direction in which the maximum size of the first opening 11 is located is a horizontal direction, and the first opening 11 is opened horizontally. In this case, the distance detection sensor 30 is disposed vertically, and the short side edge of the distance detection sensor 30 is in parallel to the horizontal direction. In this way, a length of the first opening 11 is not increased in a length direction. Similarly, as shown in FIG. 2A, when the first opening 11 is vertically opened, the distance detection sensor 30 is horizontally disposed, this avoids the length of the first opening from being excessively large, and ensures that the two cameras 20 and the distance detection sensor 30 are in an elliptical opening having a relatively smaller length.

Embodiment 2

Figure 3A:
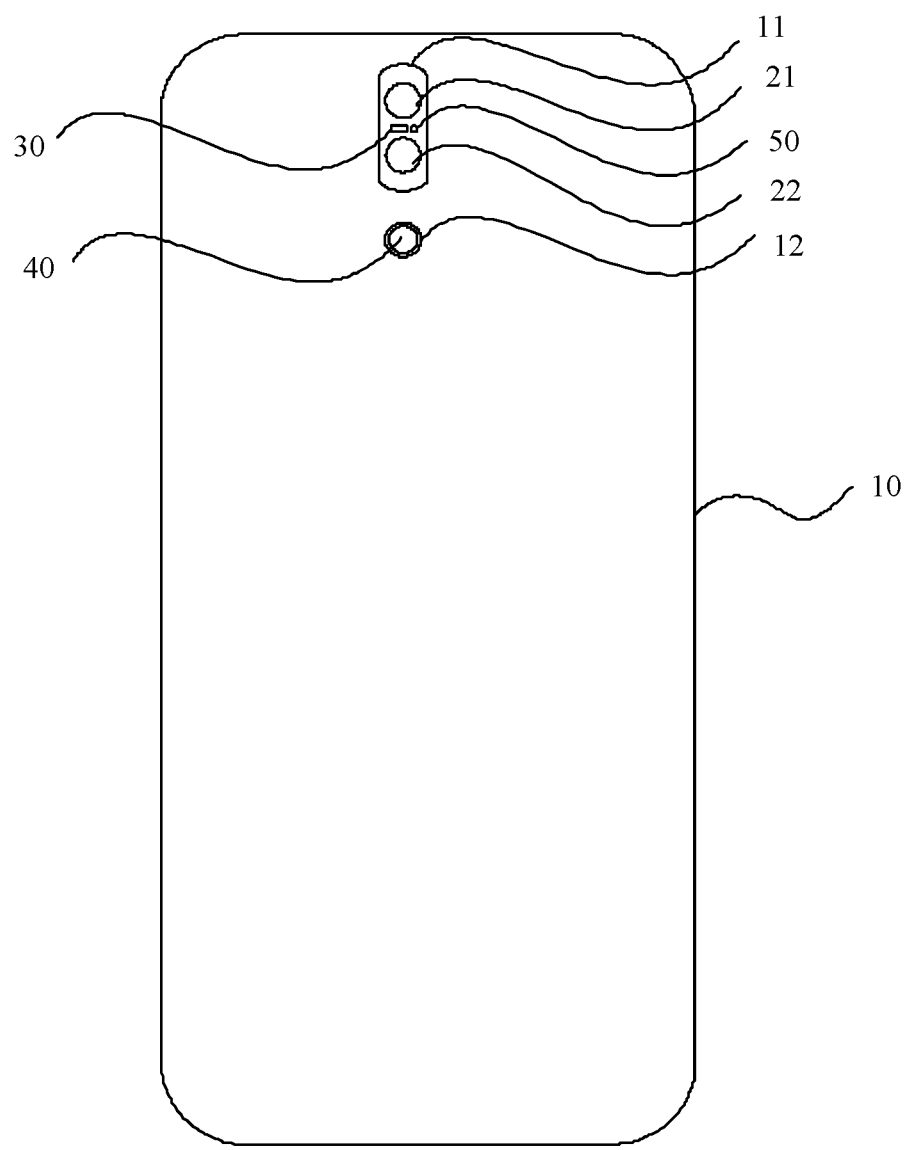
FIG. 3A and FIG. 3B are schematic structural diagrams of a rear side of a terminal according to Embodiment 2 of the application.
Figure 3B:
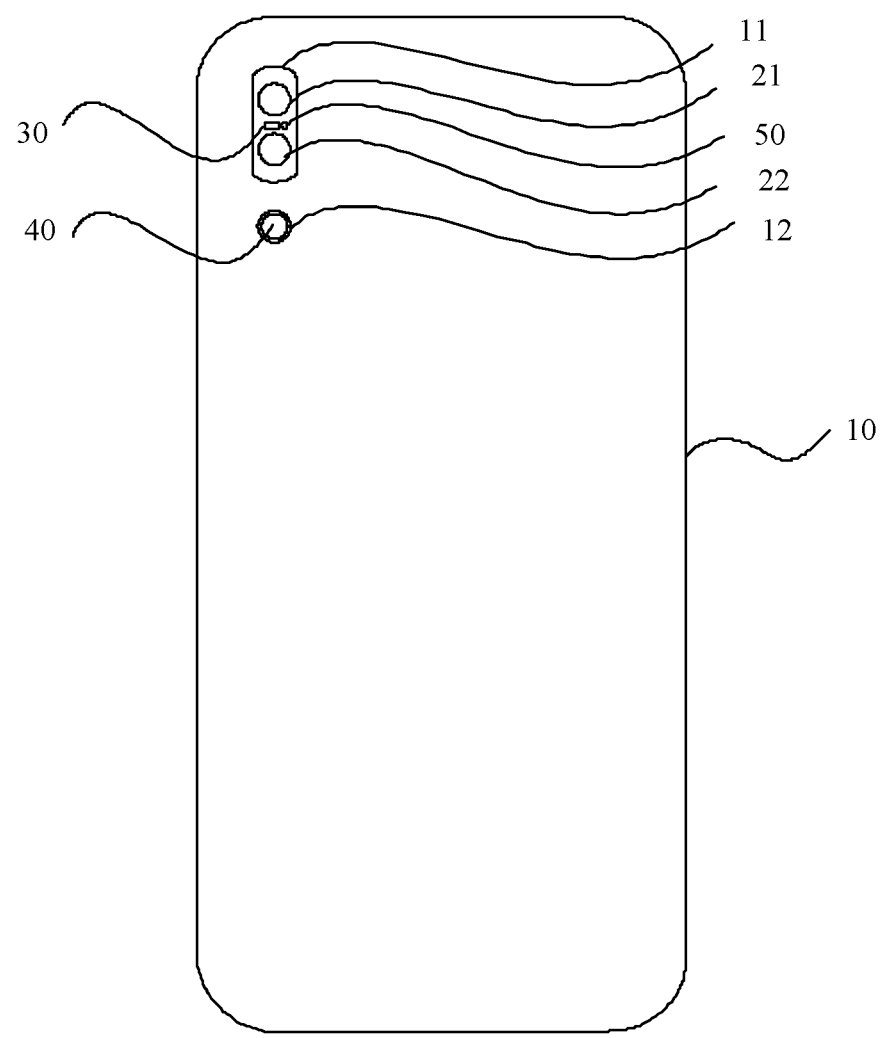

FIG. 3A and FIG. 3B are schematic structural diagrams of a rear side of a terminal according to Embodiment 2 of the application. In an embodiment, as shown in FIG. 3A and FIG. 3B, an environment detection sensor 50 is further disposed on a terminal body 10, and the environment detection sensor 50 is disposed in a first opening 11. In addition, the environment detection sensor 50 is also disposed in a gap between two of cameras 20. The environment detection sensor 50 is configured to detect ambient light, and adjust a fill light intensity of the flash 40 based on an intensity of the detected ambient light. In an embodiment, when the environment detection sensor 50 is disposed in the gap between the two cameras 20, because a gap usually exists between two adjacent cameras 20, both the distance detection sensor 30 and the environment detection sensor 50 may be disposed in the gap. In addition, even though the two adjacent cameras 20 are usually not disposed at an interval, because the cameras 20 are usually in a circular shape, even if the two adjacent cameras 20 are disposed closely, a blank gap exists between the two adjacent cameras 20 on an upper side and a lower side (when the two cameras 20 are arranged horizontally) or on a left side and a right side (when the two cameras 20 are arranged vertically) of an intersection point. In this case, the distance detection sensor 30 may be disposed in one gap (for example, an upper gap or a left gap), and the environment detection sensor 50 is disposed in another gap (for example, a lower gap or a right gap). For example, the distance detection sensor 30 and the environment detection sensor 50 are set in a left-right manner or an up-down manner in the gap between the two cameras 20. In an embodiment, because there is no interference between the distance detection sensor 30 and the environment detection sensor 50, when setting, the distance detection sensor 30 and the environment detection sensor 50 do not need to be disposed at a specific interval. However, in the prior art, the distance detection sensor 30 and the flash 40 are disposed at a same opening interval. To avoid overlapping of light cones of the distance detection sensor 30 and the flash 40, a specific interval needs to be set between the distance detection sensor 30 and the flash 40. Therefore, in an embodiment, space occupied by the distance detection sensor 30 and the environment detection sensor 50 is far less than space occupied by the distance detection sensor 30 and the flash 40. In this way, when the distance detection sensor 30 and the environment detection sensor 50 are disposed in the first opening 11, no space needs to be specially reserved in the first opening 11 for the distance detection sensor 30 and the environment detection sensor 50. Therefore, an opening area of the first opening 11 is not increased due to disposing of the distance detection sensor 30 and the environment detection sensor 50.

In an embodiment, both the distance detection sensor 30 and the environment detection sensor 50 are existing devices. For a structure and working principle of the distance detection sensor 30 and the environment detection sensor 50, refer to the prior art. Details are not described again in an embodiment.

In an embodiment, when the environment detection sensor 50 is disposed between the two cameras 20, a problem that a quantity of openings in the terminal body 10 is increased because the environment detection sensor 50 is disposed in the terminal body 10 in separate openings is avoided. In addition, when the environment detection sensor 50 is disposed in the gap between the two cameras 20, because extra space does not need to be reserved in the first opening 11 for disposing the environment detection sensor 50, a problem that an opening area of the first opening 11 is increased due to disposing of the environment detection sensor 50 is avoided. Therefore, in the terminal provided in an embodiment, an effect that a quantity of openings and a size of the openings are not affected when a sensor is added to the terminal body 10 is implemented, thereby ensuring appearance aesthetics of the terminal.

Embodiment 3

Figure 4A:
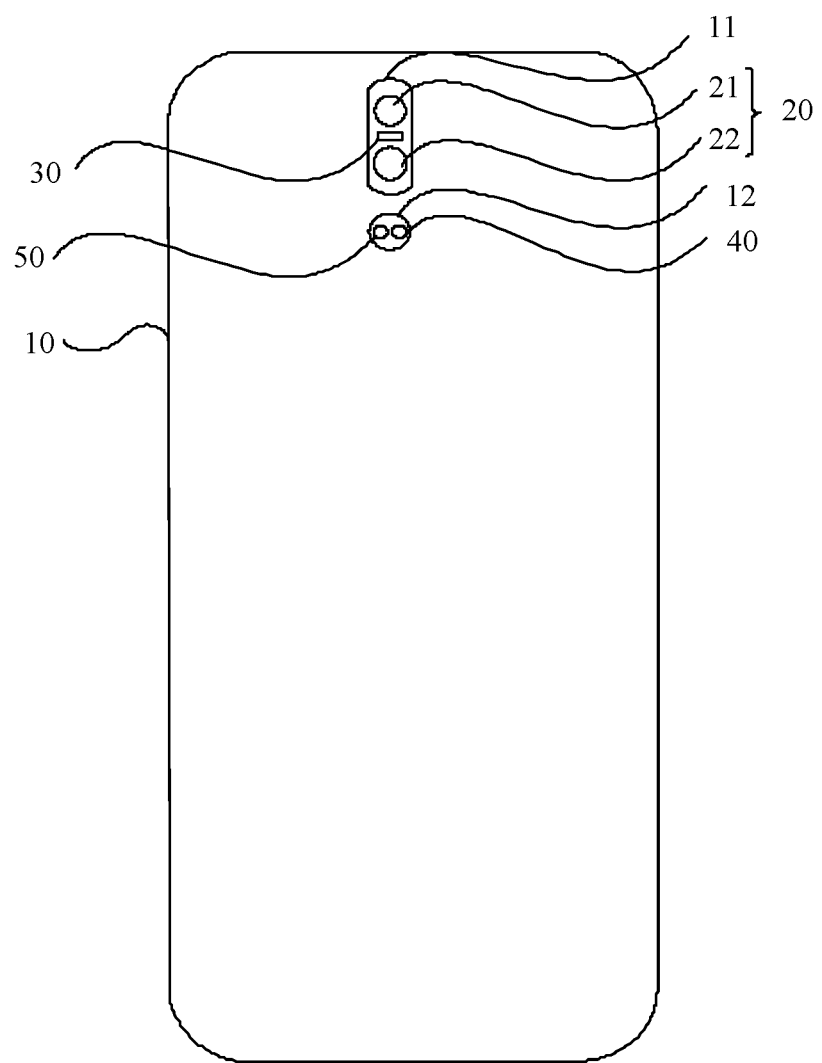
FIG. 4A and FIG. 4B are schematic structural diagrams of a rear side of a terminal according to Embodiment 3 of the application.
Figure 4B:
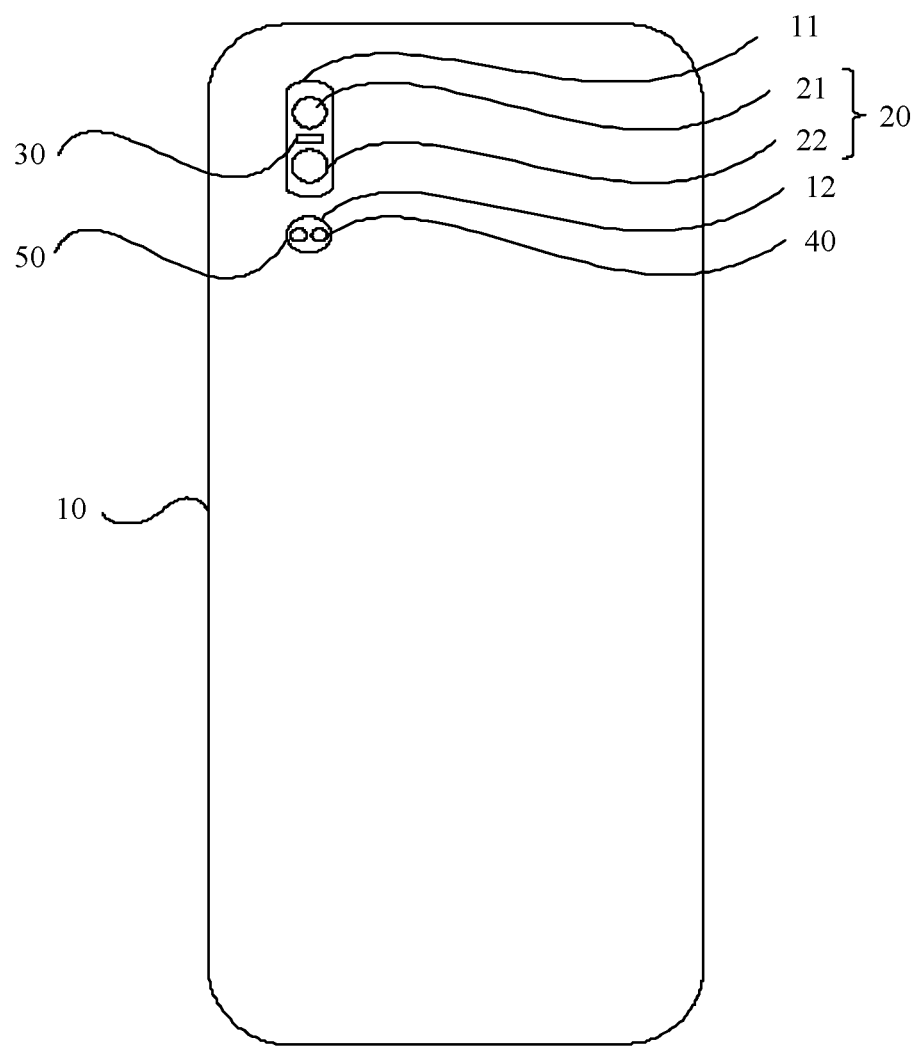
Figure 5:
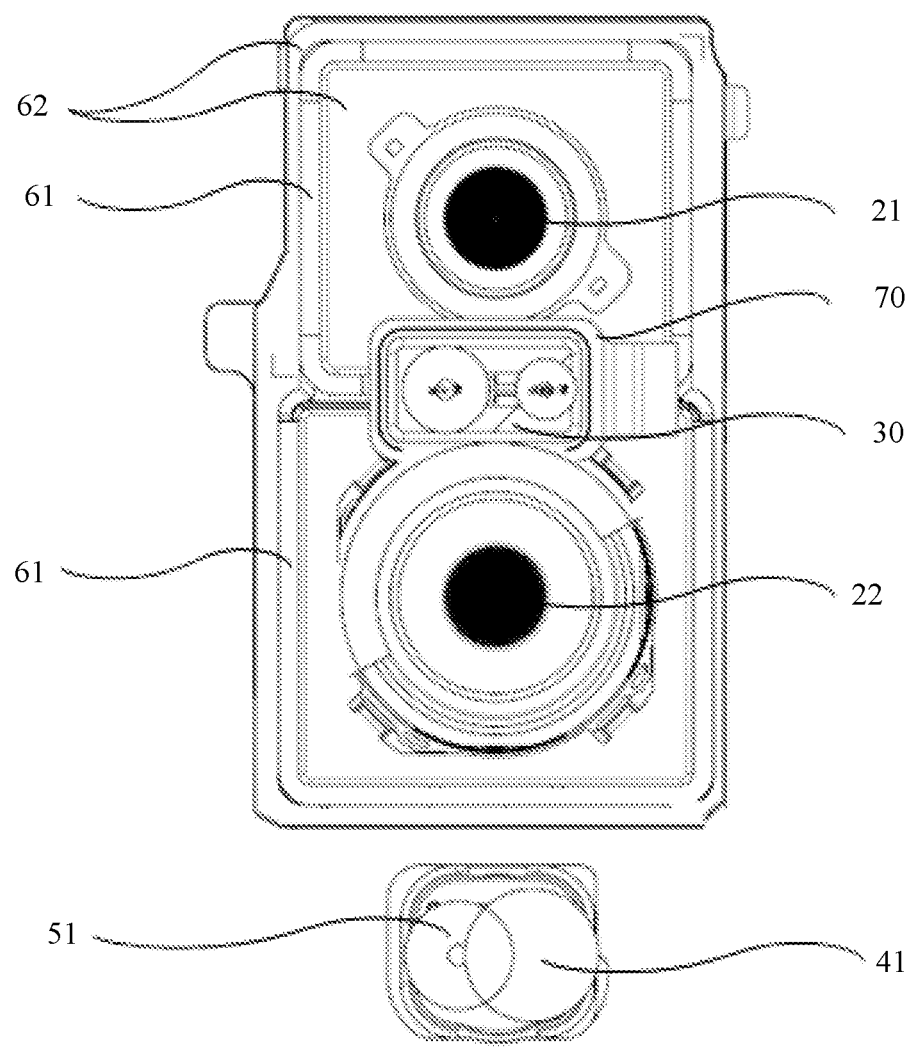
FIG. 5 is a schematic structural diagram of a camera, a sensor, and a flash in a terminal according to Embodiment 3 of the application.
Figure 6:
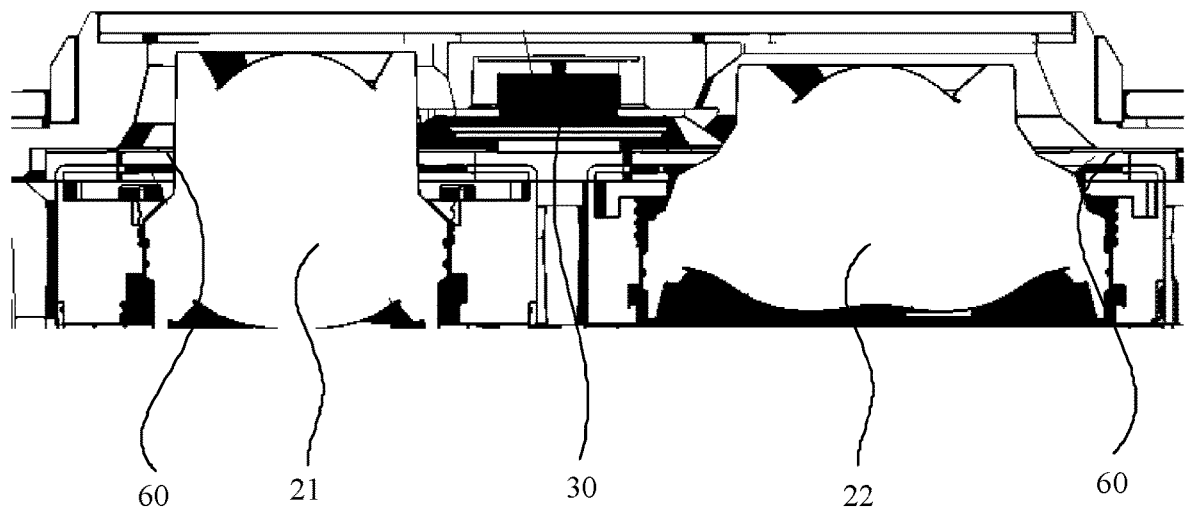
FIG. 6 is a schematic structural diagram of a part of cross section of a first opening in a terminal according to the application.
Figure 7:
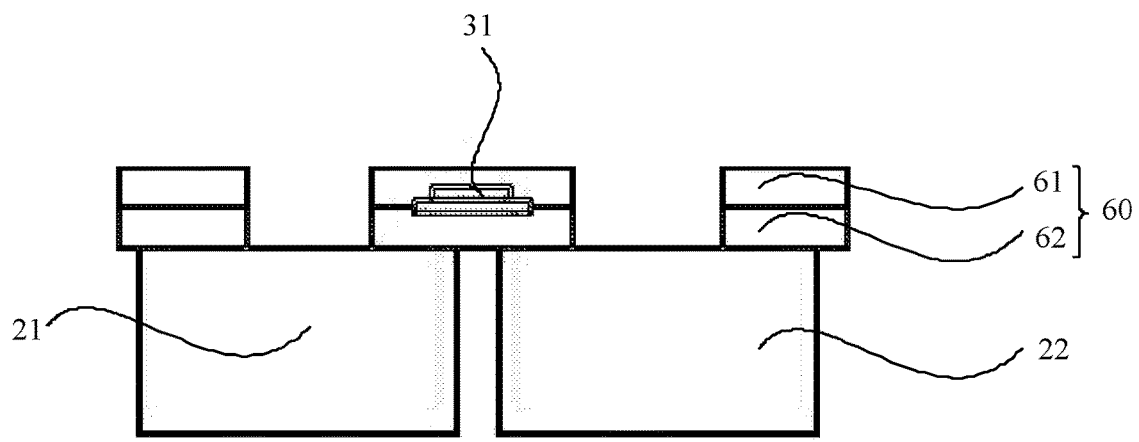
FIG. 7 is a schematic structural diagram of a cross section of a camera and a dust-proof component in a terminal according to the application.
Figure 8:
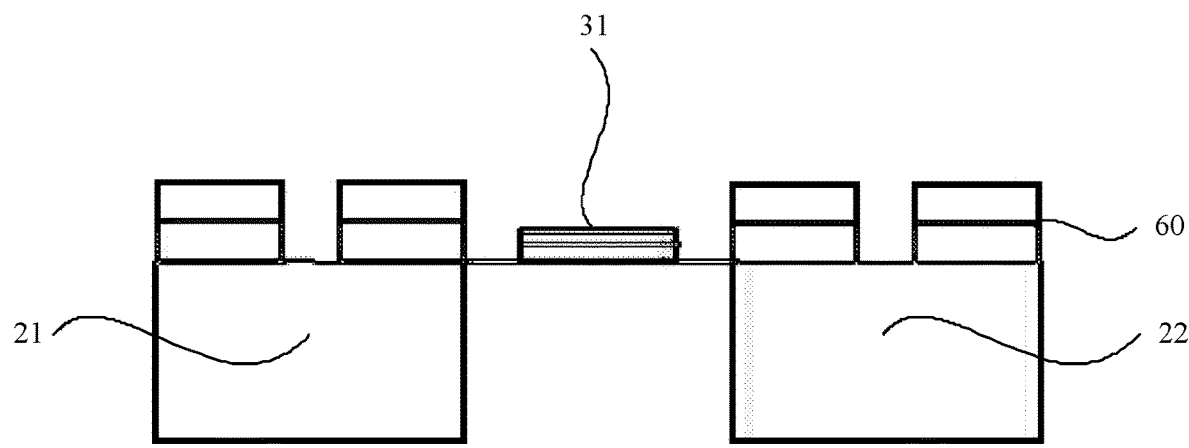
FIG. 8 is a schematic structural diagram of a cross section of a camera and a dust-proof component in an existing terminal.
Figure 9:
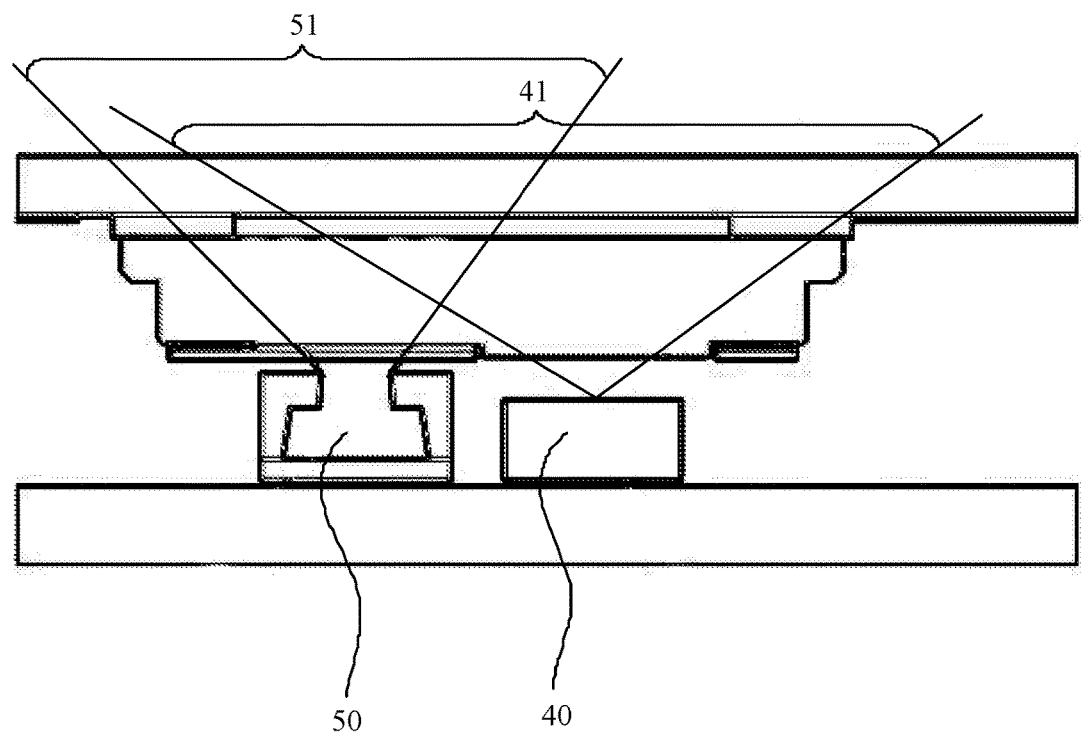
FIG. 9 is a schematic diagram of light cones of a flash and an environment detection sensor in a terminal according to the application.
Figure 10:
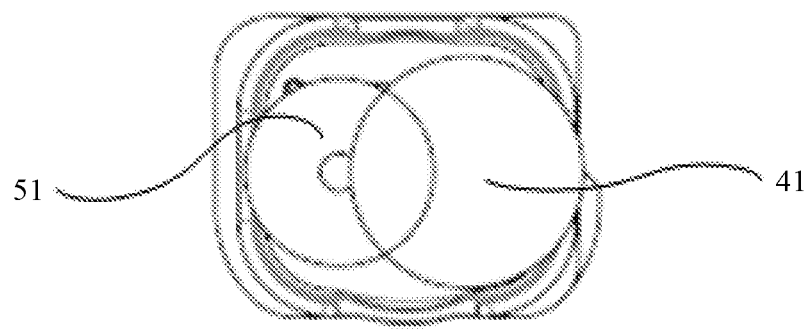
FIG. 10 is a schematic top view of light cones of a flash and an environment detection sensor in a terminal according to the application.

FIG. 4A and FIG. 4B are schematic structural diagrams of a rear side of a terminal according to Embodiment 3 of the application. FIG. 5 is a schematic structural diagram of a camera, a sensor, and a flash in a terminal according to Embodiment 3 of the application. FIG. 6 is a schematic structural diagram of a part of cross section of a first opening in a terminal according to the application. FIG. 7 is a schematic structural diagram of a cross-section of a camera and a dust-proof component in a terminal according to the application. FIG. 8 is a schematic structural diagram of a cross-section of a camera and a dust-proof component in an existing terminal. FIG. 9 is a schematic diagram of light cones of a flash and an environment detection sensor in a terminal according to the application. FIG. 10 is a schematic top view of light cones of a flash and an environment detection sensor in a terminal according to the application.

In an embodiment, as shown in FIG. 4A to FIG. 10, an environment detection sensor 50 is further disposed in the terminal body 10. The environment detection sensor 50 is configured to detect ambient light, and adjust a fill light intensity of the flash 40 based on an intensity of the detected ambient light. Because the ambient light received by the environment detection sensor 50 is visible light, in an embodiment, the environment detection sensor 50 may be disposed in the second opening 12. In this way, the environment detection sensor 50 and the flash 40 are disposed in a same opening (the first opening 11). Because a lens of the flash 40 is designed as a Fresnel texture structure by using second optics, an objective of changing a light emitting angle of an LED is achieved. The flash 40 of the mobile phone converges light to 70° to 80° by using a focusing feature of a flash lens. However, because the ambient light received by the environment detection sensor 50 is visible light, but not infrared light, the environment detection sensor 50 is not affected by a Fresnel lens that concentrates added visible light. For example, the environment detection sensor 50 and the flash 40 may share a cover of the flash, and lenses do not need to be disposed separately. When the distance detection sensor 30 and the flash 40 are disposed in a same opening, because the distance detection sensor 30 emits infrared light, and a wavelength of the infrared light is different from that of the visible light, the distance detection sensor 30 cannot use a Fresnel lens that concentrates visible light, that is, cannot share the cover of the flash 40. If the distance detection sensor 30 and the flash 40 need to share the cover, lenses need to be designed separately, and the light cones cannot overlap. In this way, when the distance detection sensor 30 and the flash 40 are disposed in one opening, an interval is needed between the distance detection sensor 30 and the flash 40 to ensure that the light cones of the distance detection sensor 30 and the flash 40 do not easily overlap. In this way, if the distance detection sensor 30 and the flash 40 are disposed in one opening, relatively large space is occupied. However, in an embodiment, when the environment detection sensor 50 and the flash 40 are disposed in the first opening 11, a lamp cover may be shared, and the lenses do not need to be designed separately, so that it is more convenient to assemble the environment detection sensor 50 and the flash 40 in the first opening 11.

In an embodiment, because the environment detection sensor 50 is not affected by the Fresnel lens that concentrates visible light of the flash 40, the environment detection sensor 50 and the flash 40 may share the cover, and lenses do not need to be disposed separately. In this way, when the environment detection sensor 50 is disposed in the second opening 12, and the light cone 41 of the flash 40 is partially overlapped with the light cone 51 of the environment detection sensor 50 (as shown in FIG. 9 and FIG. 10), when the flash 40 and the environment detection sensor 50 are disposed in the second opening 12, a spacing between the flash 40 and the environment detection sensor 50 is not limited. Therefore, during disposing, a spacing between the flash 40 and the environment detection sensor 50 may be relatively small. In this way, space occupied by the flash 40 and the environment detection sensor 50 is relatively small. In this case, the second opening 12 may be disposed with a smaller size, and finally, the second opening 12 disposed on the terminal tends to be small.

In an embodiment, as shown in FIG. 5 to FIG. 8, a dust-proof component 60 is further included. The dust-proof component 60 is sleeved on a periphery of the cameras 20 along an axial direction of the cameras 20, and the dust-proof component 60 is configured to perform a dust-proof function on the cameras 20. Dust or impurities are prevented from entering the cameras 20 by using the dust-proof component 60. When the dust-proof component 60 is disposed on the cameras 20, the dust-proof component 60 may be sleeved on each camera 20, or an outer side of the entire camera 20 may be surrounded by using the dust-proof component 60, so that the cameras 20 are located in space enclosed by the dust-proof component 60, and dust is not easily entering the space in which the lens of the cameras 20 is located.

In an embodiment, the dust-proof component 60 includes at least two layers of dust-proof foam. For example, the dust-proof component 60 may include two layers of dust-proof foam, as shown in FIG. 5 and FIG. 7, respectively a first layer of dust-proof foam 61 and a second layer of dust-proof foam 62. Alternatively, the dust-proof component 60 may further include three layers of dust-proof foam, that is, the first layer of dust-proof foam 61, the second layer of dust-proof foam 62, and a third layer of dust-proof foam. A quantity of layers of dust-proof foam included in the dust-proof component 60 is selected based on an actual requirement.

When the at least two layers of dust-proof foam are disposed, an outermost layer of dust-proof foam in the at least two layers of dust-proof foam surrounds the outer side of the cameras 20, and a plurality of through openings that the at least two cameras 20 can pass through are disposed on remaining dust-proof foam. In an embodiment, in addition to the outermost layer of dust-proof foam, the remaining dust-proof foam is sleeved on the corresponding cameras 20 by using the opened through openings. A quantity of through openings of the dust-proof foam is in a one-to-one correspondence with a quantity of cameras 20. For example, as shown in FIG. 5 and FIG. 7, the dust-proof foam has two layers. The first layer of dust-proof foam 61 is located above the second layer of dust-proof foam 62, that is, the first layer of dust-proof foam 61 is the outermost layer of dust-proof foam, where the first layer of dust-proof foam 61 is an annular dust-proof foam. The second layer of dust-proof foam 62 is a sheet-shaped dust-proof foam, and a through opening that can be used by the lens of the first camera 21 and the lens of the second camera 22 to pass through is disposed on the second layer of dust-proof foam 62. In this way, the second layer of dust-proof foam 62 is sleeved on the first camera 21 and the second camera 22, and the first layer of dust-proof foam 61 is disposed around an entire outer contour of the first camera 21 and the second camera 22. The first layer of dust-proof foam 61 and the second layer of dust-proof foam 62 are disposed to ensure that the cameras 20 are protected from dust.

In an embodiment, after the dust-proof foam is disposed on the outer side of the cameras 20, a manner of disposing the distance detection sensor 30 between the cameras 20 is as follows: a first circuit board 70 is disposed on dust-proof foam adjacent to the outermost layer of dust-proof foam, the distance detection sensor 30 is disposed on the first circuit board 70, and the first circuit board 70 is connected to the second circuit board in the terminal body 10 by using a connection line 31 that passes through two of layers of dust-proof foam. For example, in an embodiment, the distance detection sensor 30 is disposed on the first circuit board 70, and the first circuit board 70 is disposed on dust-proof foam under the outermost layer of dust-proof foam. As shown in FIG. 5, the first circuit board 70 is disposed on the second layer of dust-proof foam 62. In addition, the first circuit board 70 needs to be connected to the second circuit board in the terminal body 10. Therefore, one end of the connection line is connected to the first circuit board 70, and the other end of the connection line passes through the first layer of dust-proof foam 61 and the second layer of dust-proof foam 62 and is connected to the second circuit board. As shown in FIG. 7, the connection line 31 between one end of the first circuit board 70 and the second circuit board passes through the first layer of dust-proof foam 61 and the second layer of dust-proof foam 62. However, in the prior art, as shown in FIG. 8, the dust-proof foam is located on the cameras 20, the connection line does not pass through the two of layers of dust-proof foam, and the connection line 31 does not have dust-proof protection of the dust-proof foam, and dust is easy to enter from the connection line 31, thereby affecting the cameras 20. Therefore, compared with the prior art, in an embodiment, the first circuit board 70 is connected to the second circuit board by the connection line 31 passing through the two of layers of dust-proof foam, thereby avoiding impact on the cameras 20 caused by the dust entering from the connection line 31, and achieving a relatively good dust-proof effect on the cameras 20.

In an embodiment, the first circuit board 70 is a flexible printed circuit (FPC), and the flexible printed circuit uses a two-layer wiring solution. When the first circuit board 70 is the flexible printed circuit, the first circuit board 70 is flexible to some extent, so that assembly is easier in limited space.

In an embodiment, the second circuit board is a main control circuit board, and may be a printed circuit board (PCB).

In an embodiment, a thickness of the connection line 31 located between the two of layers of dust-proof foam decreases sequentially from the first circuit board 70 to the second circuit board. For example, when the connection line 31 passes through the two of layers of dust-proof foam, the connection line 31 located between the two of layers of dust-proof foam is successively reduced from the first circuit board 70 to the second circuit board, thereby achieving a relatively good blocking effect on dust, avoiding impact on the cameras 20 caused by dust entering from a gap of the connection line 31, and a relatively good dust-proof effect may be performed on the cameras 20 by disposing the connection line 31 in a successively thinning manner.

In an embodiment, the second opening is divided into two semi-circular openings, the two semi-circular openings may be arranged to form a circular opening in a left-right manner or an up-down manner. The flash 40 may be located in one of the semi-circular openings, and the environment detection sensor 50 may be located in the other semi-circular opening. It should be noted that, when only the flash 40 is disposed in the second opening 12, only the flash 40 is disposed in the semi-circle opening.

In an embodiment, the terminal body includes a housing. The first opening 11 and the second opening 12 are opened on a surface that is of the housing and that faces away from a screen 101. For example, the first opening 11 and the second opening 12 are located on a rear side of the housing. In this case, the first camera 21, the second camera 22, and the distance detection sensor 30 are located in a first opening 11 of the housing, and the environment detection sensor 50 and the flash 40 are located in a second opening 12 of the housing, or the first opening 11 and the second opening 12 are disposed on a surface that is of the housing and that faces the screen 101. For example, the first opening 11 and the second opening 12 are located on a front side of the housing. In this case, the first camera 21, the second camera 22, the distance detection sensor 30, the environment detection sensor 50, and the flash 40 are located on the front side of the terminal; or the first opening 11 and the second opening 12 are disposed on both a side that is of the housing and that faces away from the screen 101 and a side that is of the housing and that faces the screen 101. In this way, the first camera 21, the second camera 22, the distance detection sensor 30, the environment detection sensor 50, and the flash 40 are disposed both on a front end and a rear end of the terminal. Therefore, both the front side and the rear side of the terminal can be photographed. In an embodiment, as shown in FIG. 1B, the first opening 11 is disposed on an upper part of a front side of the housing, and the first camera 21, the second camera 22, and the distance detection sensor 30 are located in the first opening 11. Alternatively, as shown in FIG. 1C, a notch (e.g., the first opening 11) is opened at a contact position between the screen 101 and the upper part of the front side of the housing, and the first camera 21, the second camera 22, the distance detection sensor 30, and the environment detection sensor 50 are located in the notch.

In addition to the foregoing components, by using an example in which the terminal provided in an embodiment is a mobile phone, the terminal further includes components such as a radio frequency (RF) circuit, a memory, another input device, a display, a sensor, an audio circuit, an I/O subsystem, a processor, and a power supply. One of ordinary skill in the art may understand that a structure of the mobile phone shown in FIG. 1A to FIG. 4B does not constitute a limitation to the mobile phone, and the mobile phone may include more components or fewer components than those shown in the figure, or some components may be combined, or some components may be separated, or a different component deployment may be used. One of ordinary skill in the art may understand that the display belongs to a user interface (UI), and the terminal device may include more or fewer user interfaces than those shown in the figure.

The following describes each component of the terminal in detail.

The RF circuit may be configured to receive and send a signal during an information receiving and sending process or a call process. For example, the RF circuit receives downlink information of a base station, then delivers the downlink information to the processor for processing, and sends related uplink data to the base station. Generally, the RF circuit includes but is not limited to an antenna, at least one amplifier, a transceiver, a coupler, a low noise amplifier (LNA), a duplexer, and the like. In addition, the RF circuit may further communicate with a network and another device through wireless communication. The wireless communication may use any communications standard or protocol, including but not limited to a global system for mobile communications (GSM), a general packet radio service (GPRS), a code division multiple access (CDMA), a wideband code division multiple access (WCDMA), long term evolution (LTE), email, a short messaging service (SMS), and the like.

The memory may be configured to store a software program and module, and the processor runs the software program and module that are stored in the memory, to perform various function applications and data processing of the terminal. The memory may mainly include a program storage area and a data storage area, where the program storage area may store an operating system, an application program required by at least one function (such as a sound playback function and an image display function), and the like; and the data storage area may store data (such as audio data and an address book) created based on the use of the terminal, and the like. In addition, the memory may include a high-speed random access memory, and may further include a nonvolatile memory such as at least one magnetic disk storage component, a flash memory component, or another volatile solid-state storage component.

The other input devices may be configured to receive entered numeral or character information, and generate a key signal input related to user setting and function control of the terminal. For example, the other input devices may include but are not limited to one or more of a physical keyboard, a function key (such as a volume control key or an on/off key), a trackball, a mouse, a joystick, and an optical mouse (the optical mouse is a touch-sensitive surface that does not display a visual output, or an extension of a touch-sensitive surface formed by a touchscreen). The other input devices are connected to the another input device controller of the I/O subsystem, and exchange signals with the processor under control of the another input device controller.

The display screen may be configured to display information entered by the user or information provided for the user, and various menus of the terminal, and may further receive a user input. For example, the display may include a display panel and a touch panel. A display panel may be configured in a form of a liquid crystal display (LCD), an organic light-emitting diode (OLED), or the like. A touch panel is also referred to as a touchscreen, a touch-sensitive screen, or the like, and may collect a touch operation or non-touch operation of a user on or near the touch panel (such as an operation of a user on the touch panel or near the touch panel by using any suitable object or accessory such as a finger or a stylus, or including a motion sensing operation including operation types such as an isolated control operation and a multipoint control operation), and drives a corresponding connection apparatus based on a preset program. Optionally, the touch panel may include two parts: a touch detection apparatus and a touch controller. The touch detection apparatus detects a touch position and a gesture of the user, detects a signal generated by a touch operation, and transmits the signal to the touch controller. The touch controller receives touch information from the touch detection apparatus, converts the touch information into information that can be processed by the processor, and then sends the information to the processor, and can receive a command sent by the processor and execute the command. In addition, the touch panel may be implemented by using a plurality of types, such as a resistive type, a capacitive type, an infrared ray type, and a surface acoustic wave type, or the touch panel may alternatively be implemented by using any technology developed in the future. Further, the touch panel may cover the display panel. The user may perform, based on content displayed on the display panel (where the displayed content includes but is not limited to a soft keyboard, a virtual mouse, a virtual key, an icon, or the like), and an operation on or near the touch panel covering the display panel. After detecting the touch operation on or near the touch panel, the touch panel transfers the touch operation to the processor by using the I/O subsystem to determine a type of a touch event, to determine a user input. Subsequently, the processor provides a corresponding visual output on the display panel based on the type of the touch event and the user input by using the I/O subsystem. Although in FIG. 2, the touch panel and the display panel are used as two independent components to implement input and output functions of the terminal, in some embodiments, the touch panel and the display panel may be integrated to implement the input and output functions of the terminal.

The terminal may further include at least one sensor, for example, an optical sensor, a motion sensor, and another sensor. For example, the optical sensor may include an ambient light sensor and a proximity sensor, where the ambient light sensor may adjust brightness of the display panel based on luminance of the ambient light, and the proximity sensor may switch off the display panel and/or backlight when the terminal is moved to the ear. As one type of motion sensor, an acceleration sensor may detect magnitude of accelerations in various directions (e.g., on three axes), may detect magnitude and a direction of gravity when static, and may be applied to an application that recognizes an attitude of a mobile phone (for example, switching between landscape orientation and portrait orientation, a related game, and magnetometer posture calibration), and a function related to vibration recognition (e.g., a pedometer and a knock), and the like. Another sensor such as a gyroscope, a barometer, a hygrometer, a thermometer, and an infrared sensor may further be configured in the terminal. Details are not described herein.

The audio circuit, the speaker, and the microphone may provide audio interfaces between the user and the terminal. The audio circuit may convert received audio data into a signal and transmit the signal to the speaker. The speaker converts the signal into a sound signal for output. On the other hand, the microphone converts a collected sound signal into a signal. The audio circuit receives the signal and converts the signal into audio data, and outputs the audio data to the RF circuit 108 to send the audio data to, for example, another mobile phone, or outputs the audio data to the memory for further processing.

The I/O subsystem is configured to control an external input/output device, and may include another device input controller, a sensor controller, and a display controller. Optionally, the one or more another input control device controllers receive a signal from the another input device and/or send a signal to the another input device. The another input device may include a physical button (a pressing button, a rocker button, and the like), a dial pad, a slider switch, a joystick, a click scroll wheel, or an optical mouse (the optical mouse is a touch-sensitive surface that does not display a visible output, or an extension of the touch-sensitive surface formed by the touchscreen). It should be noted that the another input control device controller may be connected to any one or a plurality of the foregoing devices. The display controller in the I/O subsystem receives a signal from the display and/or sends a signal to the display. After the display detects a user input, the display controller converts the detected user input into an interaction with a user interface object displayed on the display, that is, man-machine interaction is implemented. The sensor controller may receive a signal from one or more sensors and/or send the signal to the one or more sensors.

The processor is a control center of the terminal, and connects all parts of the mobile phone by using various interfaces and lines. By running or executing the software program and/or module stored in the memory, and invoking data stored in the memory, the processor performs various functions and data processing of the terminal, thereby performing overall monitoring on the mobile phone. Optionally, the processor may include one or more processing units. Preferably, the processor may integrate an application processor and a modem processor. The application processor mainly processes an operating system, a user interface, an application program, and the like. The modem processor mainly processes wireless communication. It may be understood that the foregoing modem processor may alternatively not be integrated into the processor.

The terminal further includes the power supply (e.g., a battery) for supplying power to the components. Preferably, the power supply may be logically connected to the processor by using a power management system, thereby implementing functions such as charging, discharging and power consumption management by using the power management system.

Although not shown, the terminal may further include a front-facing camera (the first camera 21 and the second camera 22 are a rear-facing camera 20), a Bluetooth module, and the like. Details are not described herein.

The terminal may dynamically adjust the working state of components such as the process, to optimize a working efficiency. When a system load is relatively low, if a memory resource and a processor resource occupied by a currently running program is relatively low, the terminal dispose the processor in a low power consumption mode, thereby prolonging a lifecycle of the battery and reducing a temperature of the terminal. When the system load is relatively high, for example, when the user enables the system or opens an APP, the processor may be disposed in a high power consumption mode. For example, a running power consumption is improved through ultra-frequency, and the like, thereby obtaining a higher performance, shortening program enabling time, and improving user experience. It may be understood that the working state of the processor may also be implemented by starting and stopping the processor, or starting and shutting down the processor.

What is claimed is:

1. A terminal, comprising:
a terminal body;
a first camera and a second camera coupled to the terminal body;
a flash coupled to the terminal body; and
a distance detection sensor coupled to the terminal body;
wherein the first camera, the second camera, the flash and the distance detection sensor are in the terminal body;
wherein a rear side of the terminal body comprises a first opening and a second opening separate from the first opening, the second opening is located in a direction in which a maximum size of the first opening is located;
wherein the first camera, the second camera and the distance detection sensor are in the first opening, the first camera and the second camera are disposed at an interval along the direction in which the maximum size of the first opening is located, and the distance detection sensor is located in a gap between the first camera and the second camera; and
wherein the flash is in the second opening.

2. The terminal according to claim 1, wherein the terminal further comprises an environment detection sensor in the terminal body, and the environment detection sensor is in the second opening.

3. The terminal according to claim 2, wherein a light cone of the flash is partially overlapped with a light cone of the environment detection sensor.

4. The terminal according to claim 3, wherein the environment detection sensor and the flash share one lamp cover.

5. The terminal according to claim 2, wherein the second opening is a circular opening enclosed by two semi-circular openings, wherein the environment detection sensor is disposed in one of the two semi-circular openings, and the flash is disposed in other semi-circular opening of the two semi-circular openings.

6. The terminal according to claim 1, wherein the first opening is a long strip opening having a long side and a short side, and the direction in which the maximum size of the first opening is located is an extension direction of the long side, wherein the extension direction of the long side is in parallel to a top edge or a side edge of the terminal body.

7. The terminal according to claim 1, wherein the distance detection sensor is located on one side of a line connecting centers of the first camera and the second camera, or the distance detection sensor is located on the line connecting centers of the first camera and the second camera.

8. The terminal according to claim 1, wherein the first opening and the second opening are disposed along a vertical direction of the terminal body.

9. The terminal according to claim 1, wherein the distance detection sensor has a long side edge and a short side edge, and the short side edge of the distance detection sensor is parallel to the direction in which the maximum size of the first opening is located.

10. The terminal according to claim 1, wherein the terminal further comprises a dust-proof component, the dust-proof component is sleeved on a periphery of the first and second cameras along an axial direction of the first and second cameras.

11. The terminal according to claim 10, wherein the dust-proof component comprises at least two layers of dust-proof foam that are sequentially stacked along the axial direction of the first and second cameras, wherein an outermost layer of the at least two layers of dust-proof foam surrounds an outer side of the first and second cameras, and wherein a plurality of through openings for the first and second cameras to pass through are on the remaining of the at least two layers of dust-proof foam.

12. The terminal according to claim 11, wherein the terminal further comprises a first circuit board that is located on the at least two layers of dust-proof foam adjacent to the outermost layer of the at least two layers of dust-proof foam, the distance detection sensor is on the first circuit board, and one end of the first circuit board is connected to a second circuit board in the terminal body by a connection line that passes between two layers of the at least two layers of dust-proof foam.

13. The terminal according to claim 1, wherein the first camera and the second camera are adjacent cameras.

14. A terminal, comprising:
a terminal body including an environmental detection sensor;
a first camera and a second camera, coupled to the terminal body;
a flash coupled to the terminal body; and
a distance detection sensor coupled to the terminal body;
wherein the terminal body comprises a first opening and a second opening located on a same side of the terminal body, the first opening and the second opening are sequentially disposed from top to bottom of the terminal body;
wherein the first camera, second camera and the distance detection sensor are in the first opening, and the distance detection sensor is located in a gap between the first camera and the second camera, the distance detection sensor is located on a line connecting centers of the first camera and the second camera, the first camera and the second camera are disposed along a direction that is in parallel to a side edge of the terminal body; and
wherein the flash and the environmental detection sensor are in the second opening.

15. The terminal according to claim 14, wherein a light cone of the flash is partially overlapped with a light cone of the environment detection sensor.

16. The terminal according to claim 15, wherein the environment detection sensor and the flash share one lamp cover.

17. The terminal according to claim 14, wherein the second opening is a circular opening enclosed by two semi-circular openings, wherein the environment detection sensor is disposed in one of the two semi-circular openings, and the flash is disposed in other semi-circular opening of the two semi-circular openings.

18. The terminal according to claim 14, wherein the terminal further comprises a dust-proof component, the dust-proof component is sleeved on a periphery of the first camera and the second camera along an axial direction of the first camera and the second camera.

19. The terminal according to claim 14, wherein the distance detection sensor has a long side edge and a short side edge, and the short side edge of the distance detection sensor is parallel to a direction in which a maximum size of the first opening is located.

20. The terminal according to claim 14, wherein the first camera and the second camera are adjacent cameras.

\* \* \* \* \*